Oct. 7, 1969  H. A. BRUNICHE-OLSEN  3,471,328
LIXIVIATING APPARATUS

Filed Dec. 16, 1964

INVENTOR.
Henning A. Brüniche-Olsen
BY
Watson, Cole, Grindle & Watson
Attys.

Oct. 7, 1969   H. A. BRUNICHE-OLSEN   3,471,328
LIXIVIATING APPARATUS
Filed Dec. 16, 1964   5 Sheets-Sheet 2

INVENTOR.
Henning A. Brüniche-Olsen
BY
Watson, Cole, Grindle + Watson
Attys.

Oct. 7, 1969

H. A. BRUNICHE-OLSEN 3,471,328

LIXIVIATING APPARATUS

Filed Dec. 16, 1964

INVENTOR.
Henning A. Brüniche-Olsen
BY
Watson, Cole, Grindle & Watson
Attys.

United States Patent Office 3,471,328
Patented Oct. 7, 1969

3,471,328
LIXIVIATING APPARATUS
Henning Anton Bruniche-Olsen, Gentofte, Denmark, assignor to Aktieselskabet De Danske Sukkerfabrikker, Copenhagen, Denmark
Filed Dec. 16, 1964, Ser. No. 418,852
Claims priority, application Denmark, Dec. 20, 1963, 5,953/63
Int. Cl. C13d 1/12
U.S. Cl. 127—5                                        4 Claims

ABSTRACT OF THE DISCLOSURE

A lixiviating apparatus having a trough with at least two conveyors therein mounted for rotation in mutual parallel axes with each conveyor having conveying means, such as helical flights, disposed at an inclination to the longitudinal direction of the conveyor with spaced teeth in a marginal zone of the conveying means and mechanical means for periodically varying the axial location of certain portions of the adjacent conveyors.

---

This invention relates to a lixiviating apparatus of the type comprising a trough, at least two conveyors mounted in said trough for rotation about mutually parallel axes extending longitudinally of said trough, each of said conveyors having conveying means disposed at an inclination to the circumferential direction of the conveyor considered, means for supplying raw material and lixiviation liquid to longitudinally spaced zones of said trough and means for removing lixiviated material and enriched lixivating liquid from inversely spaced zones of said trough.

It is known to use apparatuses of this type for the lixiviation of various disintegrated animal and vegetable materials e.g. for the extraction of sugar from sliced sugar beets commonly known as cosettes. In the known apparatuses for this use, a lixiviating liquid such as water is supplied to the upper end of the trough and is moved towards the lower end thereof while at the same time the cosettes are supplied to the lower end of the trough and are moved in counter current to the lixiviating liquid by means of the rotatable conveyors, which are as a rule constructed as screw conveyors, towards a discharge at the upper end of the trough.

The lixiviating liquid enriched in sugar is discharged at the lower end of the trough to form a raw juice serving as raw material for the subsequent processing into sugar.

Apparatuses of the type described are very suitable for use in the lixiviation of cosettes and many other processes for the continuous lixiviation of a substance soluble in a lixiviating liquid from a disintegrated material nonsoluble in the lixiviation liquid, but permeable thereto. It has been found, however, that considerable difficulties are encountered when attempting to use the known apparatuses of the type in question for the lixiviation of crushed, shredded or otherwise disintegrated sugar canes or other materials having a markedly fibrous structure. If such a material is supplied to a lixiviation apparatus of the type referred to, it tends to get stuck between the screw blades and around the shafts of the screw conveyors to form a compact and coherent mass and thereby to choke the conveying and lixiviation region of the trough. The consequence of this is that the capacity of the apparatus is reduced and the efficiency is very considerably decreased because the formation of compacted and felted material prevent a uniform passage of liquid through the apparatus.

It is the object of the invention to remedy the described drawbacks of lixiviation apparatuses of the type referred to so as to make these suitable for use in the extraction of sugar from sugar canes or in the lixiviation of other fibrous materials.

With this object in view, according to the invention, spaced teeth are provided in the marginal zone of said conveying means and, moreover, mechanical means are provided for periodically varying, within predetermined limits, the relative axial location of such portions of the conveying means of adjacent conveyors as are at any time present in a plane through the axes of said adjacent conveyors. By this arrangement, it becomes possible to produce a relative movement by which the portion of the conveying means of one conveyor engaging in the interval between corresponding portions of the conveyor means of the other conveyor is moved forth and back in the said interval, whereby the teeth in the marginal zone of the conveying means of the former conveyor will tear up the fibrous material adhering to the shaft of the latter conveyor between successive runs (convolutions) of the conveying means thereof.

In this manner, a satisfactory feeding and lixiviation of the material is obtained.

In a preferred embodiment of the invention, the means for producing a relative displacement of the conveying means of the conveyors as above described consist of means for changing the relative speeds of rotation of adjacent conveyors. Alternatively, the said relative displacement may of course be obtained by bodily displacing the two conveyors relative to one another in the axial direction, but the former embodiment is preferable because of greater structural simplicity.

The conveyors of a lixiviation apparatus according to the invention may suitably comprise two identical screw conveyors having the same direction of rotation or two oppositely wound, but otherwise identical screw conveyors having opposite directions of rotation. The two screw conveyors may be mounted in a trough which in its longitudinal direction is inclined to horizontal, so that the lixiviation liquid supplied to the upper end of the trough will flow under the influence of the force of gravity towards the lower end of the trough in counter current to the material to be lixiviated. The conveyor blades or flights may be provided with a great number of holes through which the lixiviation liquid may pass during its movement from the upper to the lower end of the trough, the said holes being so small that the material to be lixiviated cannot pass therethrough.

The teeth are preferably arranged at the marginal edges of the screw blades at an angle of 90° to the axis of rotation. Hereby the most efficient tearing-up is secured of the material adhering to the shaft of the adjacent screw conveyor. However, the teeth may alternatively be arranged at an angle of more or less than 90° to the axis of rotation The mechanical means for periodically changing the relative speeds of rotation of the screw conveyors should be arranged in such a manner that change-over takes place every time the portion of the conveying means of one conveyor engaging in the interval between successive runs of the conveying means of the other screw conveyor has been moved relative to the latter through a distance somewhat smaller than the pitch of the screw conveyors.

On a preferred construction of this arrangement, according to the invention, a change-over member is provided which is coupled to the shafts of two adjacent conveyors through differential transmission means and is adapted, in predetermined positions thereof, to initiate change-over of the relative speeds of rotation of the shafts between predetermined values.

Hereby the advantage is obtained that the change-over of the relative speeds is made directly dependent on the relative locations of the conveying mass of adjacent conveyors.

In a preferred embodiment of the invention, the change-over means comprise a housing in which two independent hollow shafts are mounted having the same direction of rotation and being driven by one and the other of two mutually engaging screw conveyors respectively, one of said shafts being constructed with an internal thread, the other shaft being constructed to control a spindle which is axially displaceable relative to the last mentioned shaft, said spindle carrying an externally threaded nut engaging with the internal thread of the first mentioned shaft, said spindle carrying an operating member adapted on predetermined axial displacements of the spindle to operate contact means for changing over the relative speeds of rotation of the screw conveyors.

If, in the embodiment last described, the two screw conveyors have the same speed of rotation, the said two hollow shafts will rotate at the same speed, and the spindle will therefore not perform any movement relative to the shafts. If the relative speeds of rotation of the screw conveyors are changed, the spindle will perform an axial movement, which by suitably locating the operating member on the spindle and suitably selecting the distance between the contact means may be adjusted in such a manner that when the above mentioned axial distance in the plane through the axes of rotation of adjacent screw conveyors reaches a certain permissible minimum value, the operating member operates one set of contacts whereby the relative speeds of rotation of the screw conveyors are changed over in such a manner that the said distance again increases until it reaches a certain permissible maximum value, when the operating member operates the other set of contacts whereby a change-over of the relative speeds of rotation of the screw conveyors in the opposite sense takes place etc.

By the described arrangement for the periodical variation of the relative speeds of rotation of the conveyors, certainty is obtained that no collision between the screw blades of the two conveyors may take place as a result of a too late change-over of the relative speeds.

The invention will in the following be described in further detail with reference to the accompanying drawings in which—

Figure 1:
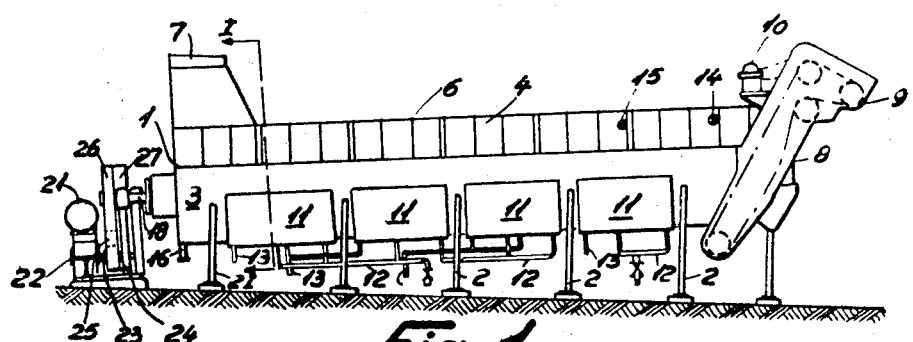
FIG. 1 shows one form of an apparatus according to the invention in side view.
Figure 2:
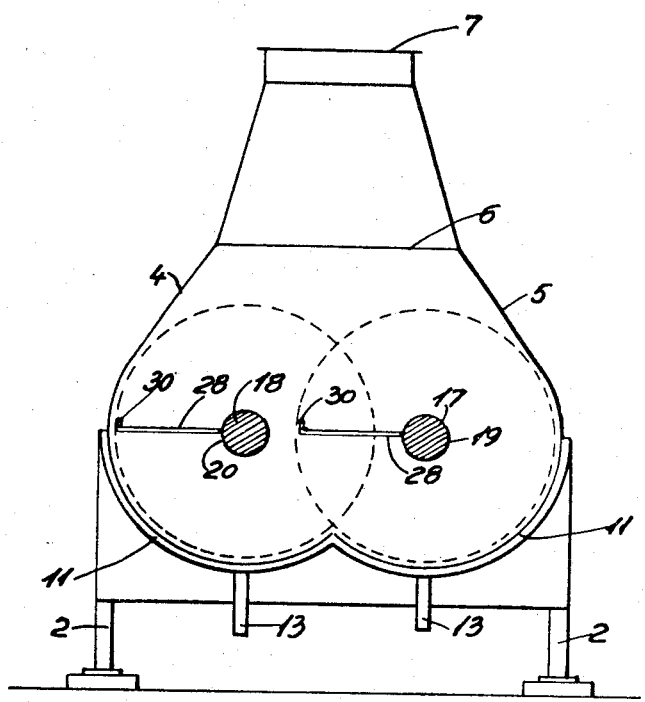
FIG. 2 is a cross section through same along the line I—I of FIG. 1.
Figure 3:
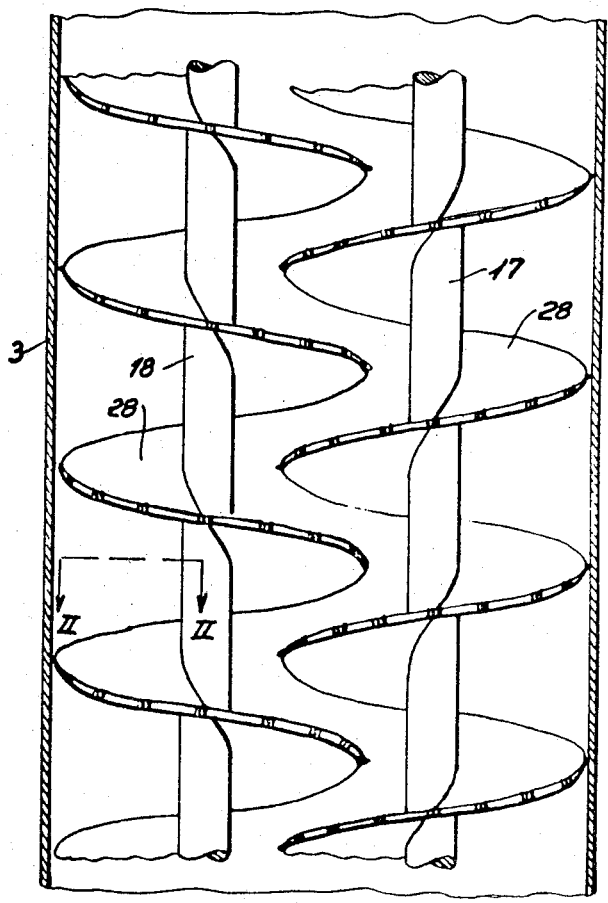
Figure 4:
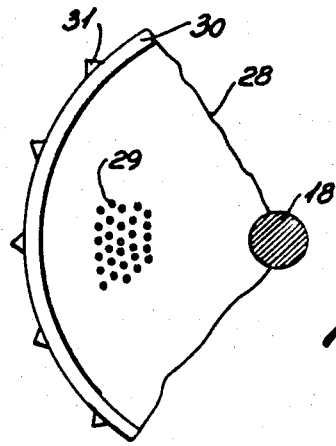
Figure 5:
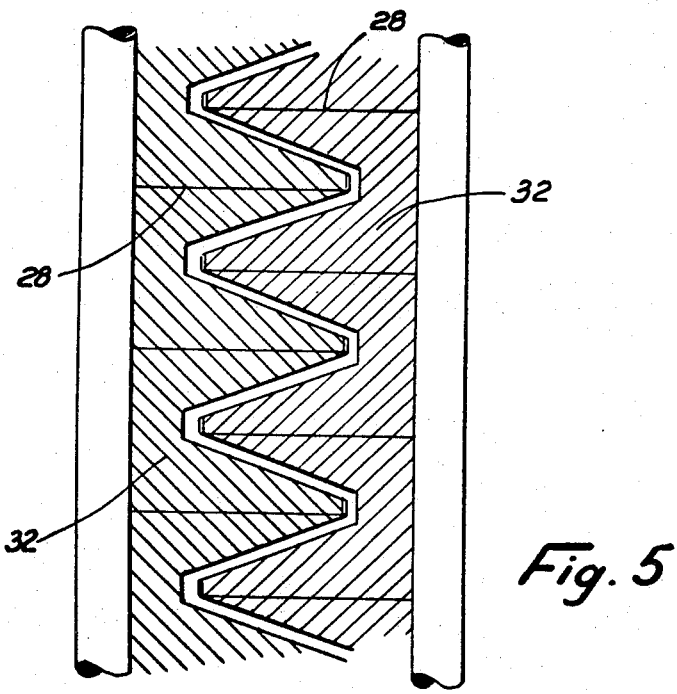
Figure 6:
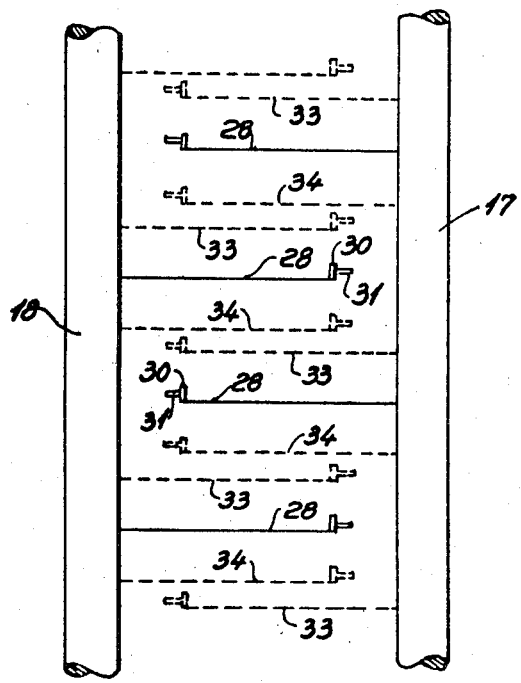
Figure 7:
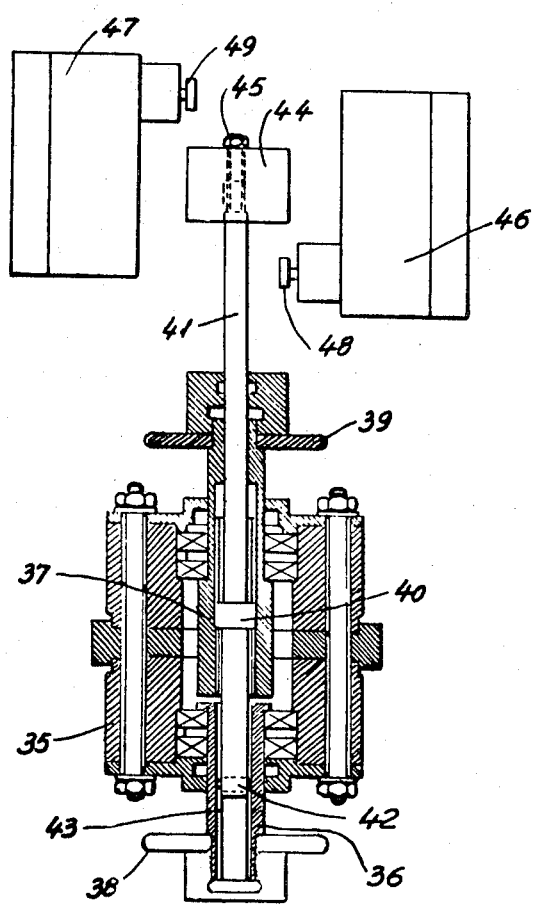

FIG. 3 shows, on an enlarged scale, part of the apparatus of FIG. 1 in top view wtih section through the trough of the apparatus, and with the upper structure removed, FIG. 4 is a part of a cross section along the line II—II through one of the screw conveyors illustrated in FIG. 3, FIG. 5 is a longitudinal section through the axes of the screw conveyors of a known apparatus, and showing only the zone between the axes, FIG. 6 is a corresponding longitudinal section through the axes of the screw conveyors of an apparatus according to the invention, and FIG. 7 is a longitudinal section through one example of an arrangement for changing over the relative speeds of rotation of the conveyors of an apparatus according to the invention.

The apparatus illustrated in FIGS. 1–4 comprises a trough 1 disposed at a slight inclination to horizontal and supported on a row of supports. The lower part 3 of the lixiviation trough has a cross section in the form of two adjoining circular arcs, and its upper part consists of inclined plates 4 and 5 and a cover 6 which is provided with inspection doors, not shown.

At the lower end of the lixiviation trough 1, a supply funnel for the material to be lixiviated is provided. The upper end of the lixiviation trough 1 merges into an inclined elevator funnel 8 which at its top has an opening 9 through which the lixiviated material is discharged. An elevator mounted in the elevator funnel 8 is driven by a motor 10 mounted at the upper end of the trough.

The lower part 3 of the lixiviation trough is provided with steam jackets 11 to which steam is supplied through steam pipes 12 and from which condensate is discharged through pipes 13.

14 is a supply pipe for fresh lixiviation liquid and 15 is a supply pipe for the liquid pressed out of the treated material when this is passed through one or more presses as e.g. roller mills upon completion of the lixiviation. The raw juice is taken out through a discharge 16 arranged at the lower end of the trough.

Two screw conveyors 19 and 20 are rotatably mounted in the lixiviation trough on parallel shafts 17 and 18 and are driven by two separate driving units arranged at the lower end of the trough. The driving unit illustrated in the drawing consists of a motor 21 and suitable gear transmission 22 connected thereto and having an output shaft 23 carrying a sprocket 24, the latter being coupled through a chain 25 to a sprocket 26 carried by the shaft 18 of the screw conveyor 20. The corresponding sprockets and the corresponding chain driving the screw conveyor 17 are axially displaced relative to the sprockets 24 and 26 as well as the chain 25, and are generally denoted in FIG. 1 by the reference character 27.

The screw conveyors 19 and 20 have equal diameter and pitch, but opposite winding directions and rotate in opposite directions. The screw blades or flights 28 of the screw conveyors are provided with a multitude of holes 29 uniformly distributed over their area. A rim 30 is attached to the marginal edge of the screw blade of each conveyor screw and carries at its outer side a row of teeth 31 at an angular spacing of about 30°, said teeth being connected with the rim by welding.

If attempting to lixiviate sugar canes in a known lixiviating apparatus of the type in question, the fibrous material 32 collects between the ridges of the screw blades 28 and around the conveyor shaft such as illustrated in FIG. 5, with the result that the screw blades of one conveyor screw compresses the material in the intervals between successive runs or ridges of the screw blade of the adjacent conveyor.

If the screw conveyors of the apparatus according to the invention rotate at the same speed, only deep helical grooves will be formed in the compressed material between the runs or ridges of the screw blades, but if the relative speeds of rotation are changed at suitable time intervals, viz. when the distance between adjacent runs of the screw blades of the two conveyors reaches a certain minimum value and a certain maximum value respectively, the screw runs of one screw conveyor 18 will be moved back and forth relative to the screw runs of the other screw conveyor 17 between two positions denoted by the reference characters 33 and 34 in FIG. 6, while at the same time the screw runs of the latter screw conveyor 18 are moved back and forth between corresponding positions 33 and 34. During this movement, the teeth 31 will tear up the material that may have collected around the shafts of the screw conveyors 17 and 18. In other words, the desired effect may be obtained by continuously changing the relative phase angle of the two screw conveyors. If phase equality, or relative phase angle O, is defined as representing the relative angular positions of the two screw conveyors, when the distance between interengaging runs of the two screw conveyors is at its minimum value, then the maximum value of the said distance will correspond to a phase displacement somewhat smaller than 360°/$n$ where $n$ is the number of parallel threads, $n$ thus being =1 in the example illustrated.

As used in the present specification, the word "runs" (ridges, convolutions) is intended to mean the portions of the conveying means of a conveyor simultaneously present in and about a certain diametrical plane.

The arrangement illustrated in FIG. 7 for the periodical change-over of the relative speeds of rotation of the screw conveyors comprises a cylindrical housing 35 in which two independent hollow shafts 36 and 37 are rotatably mounted, each of these shafts carrying a sprocket 38 and 39, respectively. These sprockets are driven by means of chains, not shown, from one and the other screw conveyor respectively, in such a manner that the two shafts 36 and 37 are caused to rotate in the same direction.

The shaft 37 is constructed internally with a steep screw thread co-operating with a nut 40 having an external thread and being rigidly secured to a spindle 41 which rotates together with the shaft 36 but is axially slidable relative thereto. This movement is secured by means of a driving pin 42 mounted in the spindle 41 and having extending ends engaged in axial grooves 43 on the inner face of the hollow shaft 36. A sleeve 44 is mounted on the spindle 41 outside the housing 35 and is axially adjustable relative to the spindle by means of a bolt 45. The arrangement moreover comprises two change-over devices 46 and 47 adapted to change over the relative speeds of the screw conveyors upon operation of contacts 48 and 49, respectively.

If the two screw conveyors rotate at the same speed, the shafts 36 and 37 will also rotate at the same speed, and the nut 40, and consequently the spindle 41, will not be displaced relative to the shafts 36 and 37. If on the other hand one screw conveyor is caused to rotate at a somewhat higher speed than the other, then the nut 40 will perform a movement relative to the shaft 37 and will thereby displace the spindle 41 in the axial direction until the sleeve 44 strikes the contact 48 or 49, as the case may be, and thereby causes a change-over of the relative speeds of the screw conveyors with the result that the spindle 41 will now be displaced in the opposite direction, until the sleeve 44 strikes the other contact 49 or 48, respectively.

By suitably adjusting the position of the sleeve 44 relative to the spindle 41 by means of the bolt 45, and suitably selecting the distance between the contacts 48 and 49, or by suitably changing the axial length of the sleeve 44, the change-over arrangement may easily be adjusted in such a manner that with a certain pitch of the screw conveyors, a change-over of the relative speeds of the conveyors takes place before the screw flights of the conveyor rotating at the higher speed catch up with and engage the screw flights of the conveyor rotating at the lower speed.

I claim:

1. A lixiviating apparatus comprising a trough, at least two conveyors mounted in said trough for rotation about mutually parallel axes extending longitudinally of said trough, each of said conveyors having conveying means disposed at an inclination to the longitudinal direction of the conveyor considered, the distance between the adjacent conveyors being at most equal to the sum of the maximum radii of the conveying means, inlet means for supplying raw material to a zone at one end of the trough, outlet means for removing lixiviated material from a zone at the opposite end of said trough, inlet means for supplying lixiviating liquid to a zone at the latter end of the trough, outlet means for removing enriched lixiviating liquid from a zone at the former end of said trough and spaced teeth in a marginal zone of said conveying means, and mechanical means for varying the relative locations of the conveying means of said conveyors within positions just prior to the points where the conveying means are in a common plane.

2. A lixiviating apparatus as in claim 1, in which said axial location varying means consist of means for changing the relative speeds of rotation of adjacent conveyors.

3. A lixiviating apparatus as in claim 2 in which said axial location varying means comprise a change-over member coupled to said shafts through differential transmission means and adapted in certain positions thereof to initiate change-over of the relative speeds of rotation of said shafts between certain values.

4. A lixiviating apparatus as in claim 3 in which said differential transmission means comprise a housing in which two independent hollow shafts are mounted having the same direction of rotation and being driven by one and the other of two mutually engaging screw conveyors respectively, one of said shafts having an internal thread, the other shaft controlling a spindle which is axially displaceable relative to the last mentioned shaft, said spindle carrying an externally threaded nut engaging with the internal thread of the first mentioned shaft, said spindle carrying an operating member adapted on predetermined axial displacements of the spindle to operate contact means for changing-over the relative speeds of rotation of the screw conveyors.

References Cited

UNITED STATES PATENTS

| | | | |
|---|---|---|---|
| 2,496,523 | 2/1950 | Dubourg | 127—7 |
| 2,885,311 | 1959 | Brüniche-Olsen et al. | 127—7 X |
| 3,142,589 | 7/1964 | Schaffer et al. | 127—3 |
| 3,343,922 | 9/1967 | Zimmer et al. | 23—285 |
| 3,355,260 | 11/1967 | Brüniche-Olsen | 127—45 |

FOREIGN PATENTS

| | | |
|---|---|---|
| 559,446 | 8/1957 | Belgium. |
| 1,057,434 | 3/1954 | France. |
| 316,486 | 12/1919 | Germany. |

MORRIS O. WOLK, Primary Examiner

D. G. CONLIN, Assistant Examiner

U.S. Cl. X.R.

23—267, 270; 127—7, 45